United States Patent
Aitken (10) Patent No.: US 10,974,989 B2
(45) Date of Patent: Apr. 13, 2021

(54) HIGH REFRACTIVE INDEX TITANIUM-NIOBIUM PHOSPHATE GLASS

(71) Applicant: Corning Incorporated, Corning, NY (US)

(72) Inventor: Bruce Gardiner Aitken, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 16/469,456

(22) PCT Filed: Jan. 23, 2018

(86) PCT No.: PCT/US2018/014826
§ 371 (c)(1),
(2) Date: Jun. 13, 2019

(87) PCT Pub. No.: WO2018/140390
PCT Pub. Date: Aug. 2, 2018

(65) Prior Publication Data
US 2019/0322571 A1  Oct. 24, 2019

Related U.S. Application Data

(60) Provisional application No. 62/450,178, filed on Jan. 25, 2017.

(51) Int. Cl.
*C03C 3/21* (2006.01)
*C03C 4/00* (2006.01)

(52) U.S. Cl.
CPC . *C03C 3/21* (2013.01); *C03C 4/00* (2013.01)

(58) Field of Classification Search
CPC .................................... C03C 3/16; C03C 3/21
See application file for complete search history.

(56) References Cited

U.S. PATENT DOCUMENTS 7,767,605 B2  8/2010  Ogino et al.
9,561,980 B2 *  2/2017  Kuwatani .............. C03C 3/064
2012/0135199 A1  5/2012  Satou et al.
2014/0228197 A1 *  8/2014  Oogaki ................... C03C 3/17
501/46
2015/0064576 A1 *  3/2015  Aitken ................... C03C 3/066
429/322
2015/0368151 A1 * 12/2015  Kuwatani .............. C03C 3/21
501/46
2016/0304390 A1  10/2016  Mikami

FOREIGN PATENT DOCUMENTS

JP        2005097036 A        4/2005
JP        2009209018 A        9/2009
JP        2014159343 A    *   9/2014
JP        2014185075 A    *  10/2014
JP        2015067522 A    *   4/2015
JP           5986938 B2   *   9/2016
JP           6444021 B2   *  12/2018
JP           6587276 B2   *  10/2019
WO    WO-2014129510 A1   *   8/2014  ............... C03C 3/21

OTHER PUBLICATIONS

Hashimoto et al; "Ti3+-Free Multicomponent Titanophosphate Glasses As Ecologically Sustainable Optical Glasses"; J. Am. Ceram. Soc., 89 [8] pp. 2521-2527 (2006.
International Search Report and Written Opinion of the International Searching Authority; PCT/US2018/014826; dated Mar. 26, 2018; 26 Pages; European Patent Office.
Rachkovskaya et al; "Semiconducting Niobate-Phosphate Glasses. Structre and Properties"; Journal of Non-Crystalline Solids, 90 (1987) pp. 617-620.
Teixeira et al; "Structure, Thermal Behavior, Chemical Durability, and Optical Properties of the Na2O—Al2O3—Nb2O5—P2O5 Glass System"; J. Am. Ceram. Soc., 90 [1] pp. 256-263 (2007.

* cited by examiner

*Primary Examiner* — Elizabeth A. Bolden
(74) *Attorney, Agent, or Firm* — Smit Kapadia (57) ABSTRACT

Disclosed herein are TiNb-phosphate glasses that present several advantages over traditional Ti-phosphate glass compositions. The glasses disclosed herein have a low devitrification tendency and can be processed by melt quenching and formed into macroscopic components. Despite the presence of niobium, the glasses have high stability indices and are chemically durable. The glasses disclosed herein are transparent and have high refractive indices, as well, making them suitable for optical applications.

22 Claims, 2 Drawing Sheets

HIGH REFRACTIVE INDEX TITANIUM-NIOBIUM PHOSPHATE GLASS

This application claims the benefit of priority under 35 U.S.C. § 371 of International Application No. PCT/US2018/014826, filed on Jan. 23, 2018, which claims the benefit of priority to U.S. Provisional Application Ser. No. 62/450,178 filed on Jan. 25, 2017, the content of which is relied upon and incorporated herein by reference in its entirety.

BACKGROUND

Glass formation in the $TiO_2$—$P_2O_5$ system is unusual as it is centered around a relatively low concentration (about 27 mol %) of the network-forming phosphate component. Due to the high titanium content of such glasses, they are characterized by a high refractive index (~1.9) as well as excellent chemical durability. Moreover, due to the absence of components such as lead, the high refractive index is achieved in these glasses without accompanying environmental and human health concerns.

Unfortunately, simple binary Ti-phosphate glasses have a high devitrification tendency and must be made by rapid quenching techniques such as roller quenching. These techniques preclude the fabrication of macroscopic pieces. If it were possible to stabilize such glasses against crystallization through the introduction of additional components, ideally ones that would not diminish the refractive index, it would then be possible to form sufficiently large samples to be used in optical applications that require a transparent and highly refractive material. One such application is for virtual and augmented reality systems.

Further, many high-$P_2O_5$ content phosphate glasses are not chemically durable and exhibit degradation or corrosion under high moisture and/or humidity conditions, thus limiting the range of applications over which they are useful.

It would thus be desirable to develop Ti-phosphate glasses with a low devitrification tendency, which would permit the use of processing techniques such as melt quenching, press molding, and the like. This, in turn, would allow the glasses to be formed into macroscopic objects and optical elements that are transparent and have high refractive indices. Further, it would be desirable if the glasses could be produced from compositions containing no lead to minimize environmental and health concerns. Even further, it would be desirable to produce a glass with lower dispersion than in comparable high refractive index glasses that contain lead or bismuth. Finally, it would be desirable for these glasses to be characterized by excellent chemical durability and not show the moisture/humidity corrosion that is typical of many phosphate glasses. The present invention addresses these needs.

SUMMARY

Disclosed herein are TiNb-phosphate glasses that present several advantages over traditional Ti-phosphate glass compositions. The glasses disclosed herein have a low devitrification tendency and can be processed by melt quenching and formed into macroscopic components. Despite the presence of niobium, the glasses have high stability indices and are chemically durable. The glasses disclosed herein are transparent when annealed in air or oxygen and have high refractive indices, as well, making them suitable for optical applications.

The advantages of the materials, methods, and devices described herein will be set forth in part in the description that follows, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION

Before the present materials, articles, and/or methods are disclosed and described, it is to be understood that the aspects described below are not limited to specific compounds, synthetic methods, or uses, as such may, of course, vary. It is also to be understood that the terminology used herein is for the purpose of describing particular aspects only and is not intended to be limiting.

In the specification and in the claims that follow, reference will be made to a number of terms that shall be defined to have the following meanings:

It must be noted that, as used in the specification and the appended claims, the singular forms "a," "an," and "the" include plural referents unless the context clearly dictates otherwise. Thus, for example, reference to "a metal oxide" in a glass composition includes mixtures of two or more metal oxides and the like.

"Optional" or "optionally" means that the subsequently described event or circumstance can or cannot occur, and that the description includes instances where the event or circumstance occurs and instances where it does not. For example, the glass compositions described herein may optionally contain an alkali metal oxide, where the alkali metal oxide may or may not be present.

As used herein, the term "about" is used to provide flexibility to a numerical range endpoint by providing that a given value may be "a little above" or "a little below" the endpoint without affecting the desired result.

Throughout this specification, unless the context dictates otherwise, the word "comprise," or variations such as "comprises" or "comprising," will be understood to imply the inclusion of a stated element, integer or step, or group of elements, integers or steps but not the exclusion of any other element, integer or step, or group of elements, integers or steps.

The "refractive index" of a material is a number that describes how light propagates through that material. It is defined by the equation $n=c/v$, where c is the speed of light in a vacuum and v is the speed of light as it propagates through the material. In one aspect, the refractive indices of the materials disclosed herein show little variation over the measured wavelength range and, hence, are characterized by low dispersion.

As used herein, the "glass transition temperature" ($T_g$) of a material characterizes the temperature at which the glass transition occurs in an amorphous material. At temperatures below $T_g$, the material exists in a hard and brittle state and at temperatures above $T_g$, the material exists in a super-cooled liquid state. $T_g$ is always lower than the melting temperature of a material's crystalline state, if a crystalline state exists for the material.

As used herein, "devitrification" is the formation of crystalline structures in glass. Devitrification can result from improper cleaning of glass surfaces, from holding the glass at a high temperature for a long time (which may cause crystals to nucleate), or simply from the tendencies of the raw materials in the glass. In one aspect, simple binary titanium phosphate glasses have a high devitrification tendency. In a further aspect, devitrification can be avoided by using rapid quenching techniques such as, for example, roller quenching. In a still further aspect, the glass compositions disclosed herein have low devitrification tendencies and thus can be quenched to the glassy state using cooling rates that are substantially slower than those associated with roller quenching.

As used herein, "glass stability index" refers to the temperature difference between the onset of crystallization ($T_x$) and the glass transition ($T_g$) as measured by differential scanning calorimetry. In one aspect, the glass compositions described herein have a high glass stability index. In a further aspect, the glass compositions described herein can have a glass stability index of 100° C. or greater, or 150° C. or greater, or 200° C. or greater.

A "network modifier" is a component that modifies the glass network in an oxide glass. In one aspect, a network modifier can destabilize glass formation. In another aspect, on its own, a network modifier will not form a glass but can be included in glass compositions to alter the properties of the compositions.

"Dispersion" as used herein is a change in the refractive index of a material with wavelength. In one aspect, the glass compositions described herein have lower dispersion than other high refractive index glasses such as, for example, glasses containing lead or bismuth.

"Melt quenching" is a common technique for producing glasses. In melt quenching, raw materials are mixed into a batch and melted; the duration and temperature of the melt depend on the melting points of the individual components. Following melting, the glass can be cast and then annealed near $T_g$ to remove thermal stresses that may remain. Glasses that have been melt quenched can be further processed by sawing, grinding, polishing, and other techniques. In one aspect, the glass compositions disclosed herein can be processed via melt quenching. In a further aspect, the glass compositions disclosed herein can be fabricated into macroscopic pieces.

"Roller quenching" is a rapid quenching technique used in the processing of materials with poor glass forming tendencies into glasses. In roller quenching, the glass melt is poured through rollers. In one aspect, glasses processed by roller quenching cannot be fabricated into macroscopic pieces. In another aspect, the glass compositions disclosed herein have good glass forming tendencies and do not need to be processed by roller quenching.

"Annealing" as used herein is the process of slowly cooling hot glass after the formation of an object from the glass. In one aspect, annealing can relieve internal stresses introduced during the manufacture of a glass object. In another aspect, the glasses described herein can be strongly colored when formed by conventional melting in air, but can be bleached to transparency by annealing in air or oxygen at elevated temperatures, including temperatures near $T_g$. The "annealing temperature" or "annealing point" of glass is the temperature at which the viscosity of the glass reaches $10^{13.2}$ Poise. In one aspect, at the annealing temperature, glass is still hard enough that it can resist external deformation (and any resultant breakage) but becomes just soft enough to relax internal strains. In one aspect, the annealing points of the glasses disclosed herein can range from 540 to 800° C.

A material such as an object formed from a glass composition can change in shape, area, or volume in response to a change in temperature. The "coefficient of thermal expansion" is the degree of expansion divided by the change in temperature and can vary with temperature. In one aspect, the glass compositions disclosed herein have volumetric coefficients of thermal expansion ($\alpha_{300}$) ranging from $30\text{-}75\times10^{-7}/°$ C. over the range from room temperature to 300° C.

References in the specification and claims to atomic percentages of a particular element in a composition or article denote the molar relationship between the element or component and any other elements or components in the composition or article for which an atomic percentage is expressed. Thus, in a compound containing 2 atomic percent of component X and 5 atomic percent of component Y, X and Y are present at a molar ratio of 2:5, and are present in such a ratio regardless of whether additional components are contained in the compound.

As used herein, a plurality of items, structural elements, compositional elements, and/or materials may be presented in a common list for convenience. However, these lists should be construed as though each member of the list is individually identified as a separate and unique member. Thus, no individual member of any such list should be construed as a de facto equivalent of any other member of the same list based solely on its presentation in a common group, without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range was explicitly recited. As an illustration, a numerical range of "about 1 to about 5" should be interpreted to include not only the explicitly recited values of about 1 to about 5, but also to include individual values and sub-ranges within the indicated range. Thus, included in this numerical range are individual values such as 2, 3, and 4, the sub ranges such as from 1-3, from 2-4, from 3-5, etc., as well as 1, 2, 3, 4, and 5 individually. The same principle applies to ranges reciting only one numerical value as a minimum or maximum. Furthermore, such an interpretation should apply regardless of the breadth of the range or the characteristics being described.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc. of these materials are disclosed, that while specific reference to each various individual combination and permutation of these compounds may not be explicitly disclosed, each is specifically contemplated and described herein. For example, if a glass composition is disclosed and discussed and a number of different metal oxide additives are discussed, each and every combination of glass composition and metal oxide additive that is possible is specifically contemplated unless specifically indicated to the contrary. For example, if a class of glass compositions A, B, and C are disclosed, as well as a class of metal oxide additives D, E, and F, and an example combination of A+D is disclosed, then even if each is not individually recited, each is individually and collectively contemplated. Thus, in this example, each of the combinations A+E, A+F, B+D, B+E, B+F, C+D, C+E, and C+F is specifically contemplated and should be considered from disclosure of A, B, and C; D, E, and F; and the example combination of A+D. Likewise, any subset or combination of these is also specifically contemplated and disclosed. Thus, for example, the sub-group of A+E, B+F, and C+E is specifically contemplated and should be considered from disclosure of A, B, and C; D, E, and F; and the example combination of A+D. This concept applies to all aspects of the disclosure including, but not limited to, steps in methods of making and using the disclosed compositions. Thus, if there are a variety of additional steps that can be performed with any specific embodiment or combination of embodiments of the disclosed methods, each such combination is specifically contemplated and should be considered disclosed.

The glass compositions described herein contain titanium dioxide ($TiO_2$). In one aspect, the amount of titanium dioxide is from about 1 mol % to about 70 mol %. In one aspect, $TiO_2$ is present at about 1, 2, 3, 4, 5, 10, 15, 20, 25, 30, 35, 40, 45, 50, 55, 60, 65, or 70 mol %, where any value can be a lower- and upper-endpoint of a range (e.g., 20% to 60%, 30% to 50%, etc.).

The glass compositions described herein contain $Nb_2O_5$. In a further aspect, the amount of $Nb_2O_5$ is from about 1 mol % to about 40 mol %. In a still further aspect, the $Nb_2O_5$ is present at about 1, 2, 3, 4, 5, 10, 15, 20, 25, 30, 35, or 40 mol %, where any value can be a lower- and upper-endpoint of a range (e.g., 10% to 40%, 20% to 35%, etc.). Although $Nb_2O_5$ has traditionally been regarded as a destabilizing glass network modifier, it has been surprisingly discovered that $Nb_2O_5$ actually serves to increase the glass stability index of the glasses disclosed herein. Additionally, the presence of $Nb_2O_5$ in the glasses described herein contributes to an increase in refractive index of the glass materials.

In one aspect, the molar sum of the $TiO_2$ and $Nb_2O_5$ in the glass composition is greater than 15 mol %, greater than 40 mol %, or greater than 60 mol %. In another aspect, the molar sum of $TiO_2$ and $Nb_2O_5$ in the glass composition is 20, 25, 30, 35, 40, 45, 50, 55, 60, 65, 70, 75, or 80 mol %, where any value can be a lower- and upper-endpoint of a range (e.g., 40% to 80%, 50% to 70%, etc.).

The glass compositions described herein contain $P_2O_5$. In one aspect, the amount of $P_2O_5$ is from about 20 mol % to about 45 mol %. In another aspect, the amount of $P_2O_5$ is about 20, 25, 30, 35, 40, or 45 mol %, where any value can be a lower- and upper-endpoint of a range (e.g., 20% to 45%, 25% to 40%, etc.). In some aspects, the amount of $P_2O_5$ is decreased by the addition of one or more additional components. For example, the metal oxide $B_2O_3$ can be added, which will reduce the amount of $P_2O_5$ needed to produce the glass.

Figure 1:
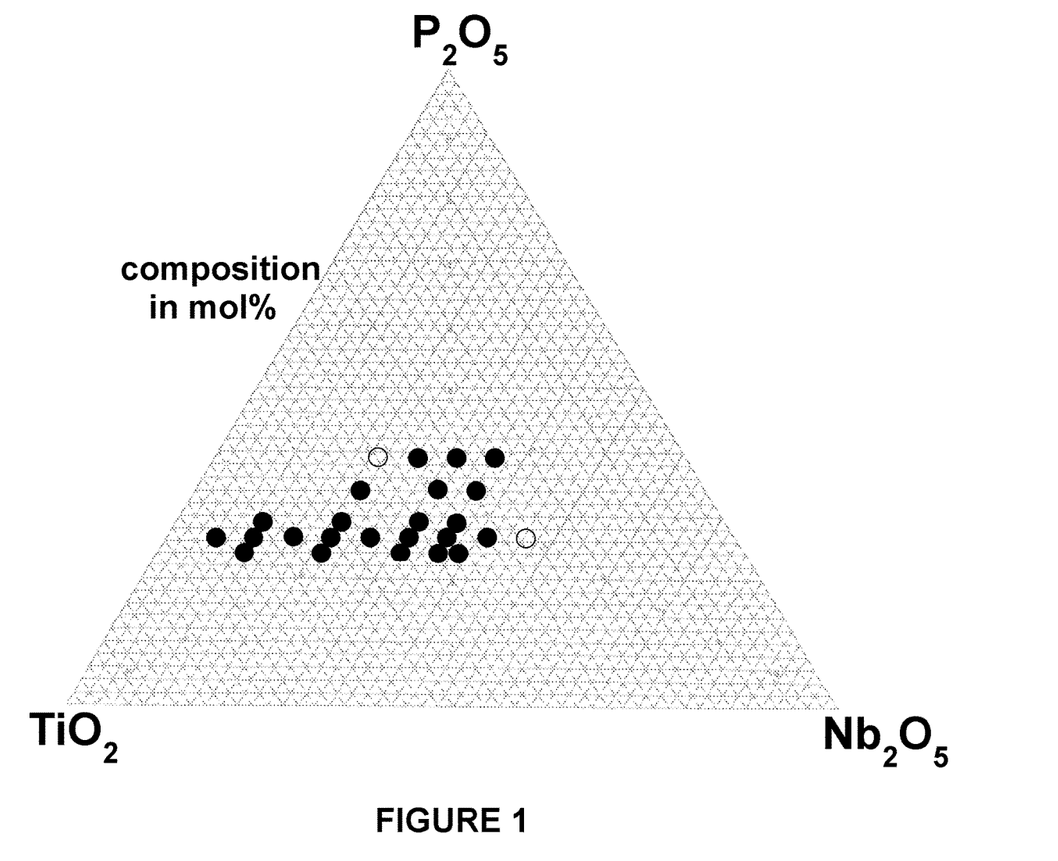
FIG. 1 shows ternary TiNb phosphate compositions (in mol %) that yield stable glasses (filled circles) when quenched from a melt. Compositions that devitrify on cooling or that fail to form a homogeneous liquid when melted at 1600° C. are represented by open circles.

In one aspect, provided herein are ternary glass compositions containing only $TiO_2$, $Nb_2O_5$, and $P_2O_5$, where the amount of each component can be any value described above. In another aspect, the glass compositions described herein may be essentially ternary compositions but may contain small amounts of one or more additives known in the art. Several ternary glasses described herein are stable glasses as shown in FIG. 1.

In one aspect, the glass compositions described herein further contain one or more metal oxides selected from the group consisting of $Na_2O$, $Rb_2O$, $Cs_2O$, $MgO$, $CaO$, $SrO$, $BaO$, $ZnO$, $CdO$, $Y_2O_3$, $La_2O_3$, $ZrO_2$, $B_2O_3$, $Al_2O_3$, $Ga_2O_3$, $SiO_2$, $GeO_2$, $SnO_2$, $Sb_2O_3$, $Bi_2O_3$, $K_2O$, and combinations thereof. In another aspect, the glass compositions contain one, two, three, or four metal oxides from those listed above. In a further aspect, the glass compositions described herein do not include $K_2O$ or $Li_2O$.

In one aspect, the glass composition includes $Na_2O$. In this aspect, the amount of $Na_2O$ is greater than 0 mol % and less than or equal to about 15 mol %. Further in this aspect, the amount of $Na_2O$ can be about 1, 2, 3, 4, 5, 6, 7, 8, 9, 10, 11, 12, 13, 14, or about 15 mol %, where any value can be a lower- and upper-endpoint of a range (e.g., 1% to 15%, 5% to 10%, etc.).

In another aspect, the glass composition includes BaO. In this aspect, the amount of BaO is greater than 0 mol % and less than or equal to about 45 mol %, or is about 5, 10, 15, 20, 25, 30, 35, 40, or 45 mol %, where any value can be a lower- and upper-endpoint of a range (e.g., 5% to 45%, 10% to 40%, etc.).

In another aspect, the glass composition includes ZnO. In this aspect, the amount of ZnO is greater than 0 mol % and less than or equal to about 45 mol %, or is about 5, 10, 15, 20, 25, 30, 35, 40, or 45 mol %, where any value can be a lower- and upper-endpoint of a range (e.g., 1% to 15%, 5% to 10%, etc.).

In another aspect, the glass composition includes $B_2O_3$. Further in this aspect, the amount of $B_2O_3$ is greater than 0 mol % and less than or equal to about 10 mol %, or is about 1, 2, 3, 4, 5, 6, 7, 8, 9, or 10 mol %, where any value can be a lower- and upper-endpoint of a range (e.g., 1% to 10%, 3% to 9%, etc.).

In another aspect, the glass composition includes $SnO_2$. In this aspect, the amount of $SnO_2$ is greater than 0 mol % and less than or equal to about 10 mol %, or is about 1, 2, 3, 4, 5, 6, 7, 8, 9, or 10 mol %, where any value can be a lower- and upper-endpoint of a range (e.g., 1% to 10%, 3% to 9%, etc.).

In another aspect, the glass composition includes $K_2O$. Further in this aspect, the amount of $K_2O$ is greater than 0 mol % and less than or equal to about 20 mol %, or is about 2, 4, 6, 8, 10, 12, 14, 16, 18, or about 20 mol %, where any value can be a lower- and upper-endpoint of a range (e.g., 2% to 20%, 4% to 18%, etc.).

In one aspect, the glass composition includes $TiO_2$ in the amount of 1 mol % to 70 mol %, $Nb_2O_5$ in the amount of 1 mol % to 40 mol %, and $P_2O_5$ in the amount of 20 mol % to 45 mol %, wherein the glass does not include $K_2O$ or $Li_2O$. The amount of each component can be any value described above.

In another aspect, the glass composition includes $TiO_2$ in the amount of 1 mol % to 70 mol %, $Nb_2O_5$ in the amount of 1 mol % to 40 mol %, and $P_2O_5$ in the amount of 20 mol % to 45 mol %, wherein the molar sum of $TiO_2$ and $Nb_2O_5$ in the glass composition is greater than 15 mol %, wherein the glass does not include $SiO_2$, $WO_3$, or a combination thereof. The amount of each component can be any value described above.

In another aspect, the glass composition includes $TiO_2$ in the amount of 5 mol % to 70 mol %, $Nb_2O_5$ in the amount of 5 mol % to 40 mol %, $P_2O_5$ in the amount of 20 mol % to 45 mol %, and one to four additional metal oxides selected from the group consisting of $Na_2O$, $Rb_2O$, $Cs_2O$, MgO, CaO, SrO, BaO, ZnO, CdO, $Y_2O_3$, $La_2O_3$, $ZrO_2$, $B_2O_3$, $Al_2O_3$, $Ga_2O_3$, $SiO_2$, $GeO_2$, $SnO_2$, $Bi_2O_3$, $Li_2O$, and $Sb_2O_3$. The amount of each component can be any value described above.

In another aspect, the glass composition includes $TiO_2$ in the amount of 1 mol % to 70 mol %, $Nb_2O_5$ in the amount of 1 mol % to 40 mol %, $P_2O_5$ in the amount of 20 mol % to 45 mol %, and two to four additional metal oxides selected from the group consisting of $Na_2O$, $K_2O$, $Li_2O$, $Rb_2O$, $Cs_2O$, MgO, CaO, SrO, BaO, ZnO, CdO, $Y_2O_3$, $La_2O_3$, $ZrO_2$, $B_2O_3$, $Al_2O_3$, $Ga_2O_3$, $SiO_2$, $GeO_2$, $SnO_2$, $Bi_2O_3$, $Li_2O$, and $Sb_2O_3$. The amount of each component can be any value described above.

The glass compositions described herein can be prepared using techniques known in the art. In one aspect, the glass compositions disclosed herein can be prepared by melt quenching. In one aspect, $P_2O_5$ can be added as phosphoric acid ($H_3PO_4$) in combination with $TiO_2$ and $Nb_2O_5$. Further in this aspect, when phosphoric acid is added, the batch materials can be calcined at 350 to 400° C. prior to melting. In another aspect, $P_2O_5$ can be added as anhydrous phosphorus pentoxide. In one aspect, the batch materials are melted at 1,550 to 1,600° C. In another aspect, the batch materials are melted in platinum crucibles.

In one aspect, provided herein are glass compositions having a refractive index of at least 1.75 at 633 nm at 25° C., or a refractive index at 633 nm at 25° C. of about 1.75, 1.80, 1.85, 1.90, 1.95, 2.00, 2.05, or 2.10, where any value can be a lower- and upper-endpoint of a range (e.g., 1.75 to 2.05, 1.90 to 2.00, etc.). In another aspect, the glass compositions have a refractive index of at least 1.75 at 1549 nm at 25° C., or a refractive index at 1549 nm at 25° C. of about 1.75, 1.80, 1.85, 1.90, 1.95, 2.00, 2.05, or 2.10, where any value can be a lower- and upper-endpoint of a range (e.g., 1.75 to 2.05, 1.90 to 2.00, etc.).

Figure 2:
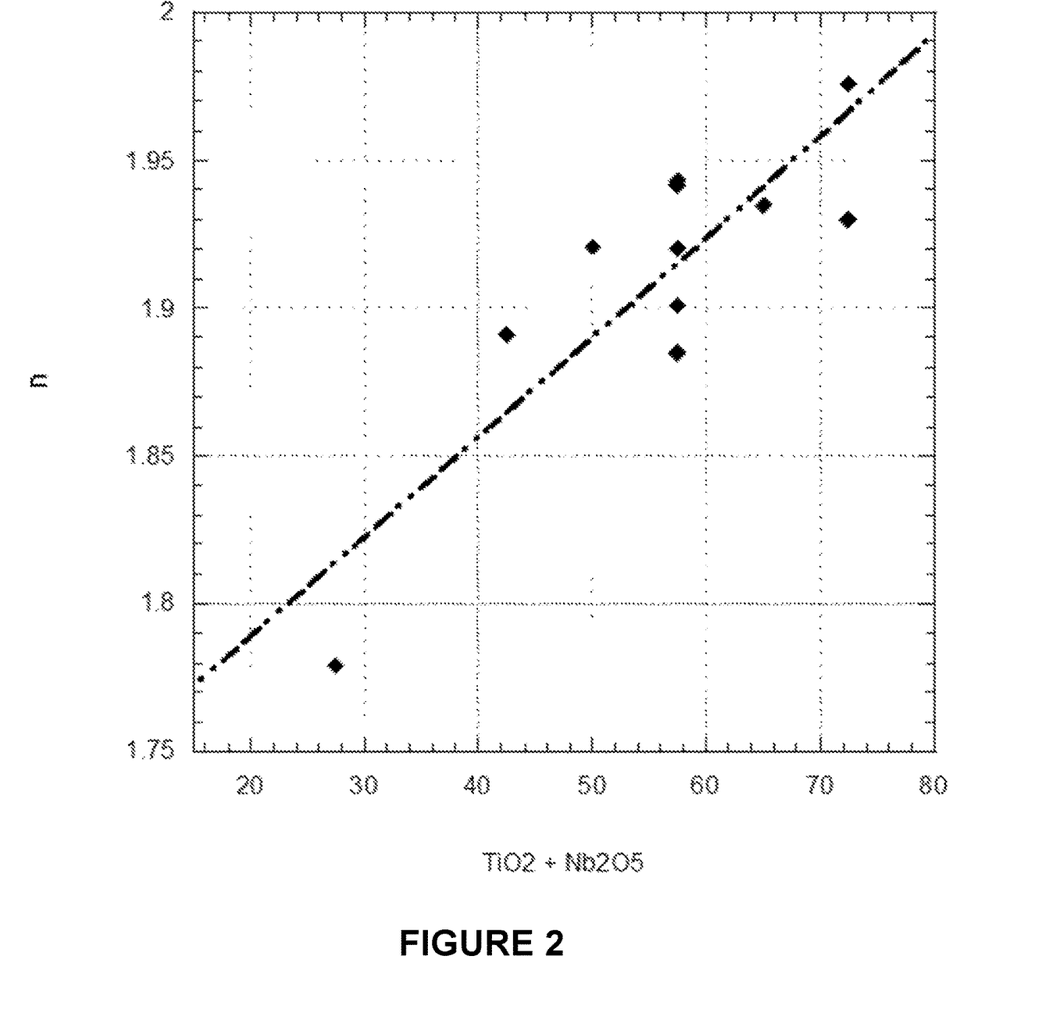
FIG. 2 shows the refractive index at 1549 nm ($n_{1549}$) for various glass compositions with combined percentages of $TiO_2$ and $Nb_2O_5$ ranging from about 20 to about 80 mol %. The refractive index increases at higher combined $TiO_2$+$Nb_2O_5$ percentages.

In one aspect, the refractive index of the glass tracks roughly linearly with the total titanium+niobium content of the glass, with an approximately 30 mol % molar sum of $TiO_2+Nb_2O_5$ yielding a refractive index at 1549 nm of about 1.78 and an approximately 66 mol % molar sum of $TiO_2+Nb_2O_5$ yielding a refractive index at 1549 nm of about 1.97 (see FIG. 2). Thus, by varying the amount of $TiO_2$ and $Nb_2O_5$ it is possible to fine tune the refractive index of the glass compositions described herein.

In another aspect, the glass compositions described herein have a coefficient of thermal expansion $\alpha_{300}$ over the temperature range from room temperature to 300° C. of from about $30 \times 10^{-7}/°$ C. to about $75 \times 10^{-7}/°$ C. In one aspect, the coefficient of thermal expansion $\alpha_{300}$ over the temperature range from room temperature to 300° C. is about 30, 31, 32, 33, 34, 35, 36, 37, 38, 39, 40, 41, 42, 43, 44, or about $45 \times 10^{-7}/°$ C., where any value can be a lower- and upper-endpoint of a range (e.g., 30 to $45 \times 10^{-7}/°$ C., 35 to $45 \times 10^{-7}/°$ C., etc.).

In still another aspect, the glass compositions disclosed herein have annealing points of from about 540° C. to about 800° C. In another aspect, the annealing point of the glass composition is about 550, 575, 600, 625, 650, 675, 700, 725, 750, 775, or about 800° C., where any value can be a lower- and upper-endpoint of a range (e.g., 600 to 800° C., 650 to 750° C., etc.).

In one aspect, the glass compositions described herein are stable enough that they can be cast into large shapes approximately 1 cm thick and cooled to glass without devitrification.

In one aspect, the glass compositions disclosed herein exhibit excellent chemical durability. In another aspect, although typical phosphate glasses corrode under high moisture/high humidity conditions, the glasses disclosed herein do not deteriorate in this manner.

In another aspect, the glass compositions disclosed herein have low dispersion in addition to high refractive index. Without wishing to be bound by theory, it is believed that because titanium and niobium have inert gas electron configurations, lower dispersion results than with comparable high refractive index glasses containing lead or bismuth.

In one aspect, the glass compositions described herein can be used to produce optical articles. In one aspect, the optical article is transparent. In another aspect, the glasses provided herein may be strongly colored when formed by conventional melting in air but the color can be removed. In one aspect, the color is removed by annealing the glasses in air or oxygen at temperatures near $T_g$ for the glass compositions. In another aspect, the optical article can be used in a virtual reality or augmented reality system.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventor regard as his discovery. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. Numerous variations and combinations of reaction conditions (e.g., component concentrations, desired solvents, solvent mixtures, temperatures, pressures, and other reaction ranges and conditions) can be used to optimize the product purity and yield obtained from the described process. Only reasonable and routine experimentation will be required to optimize such process conditions.

Example 1

Production of TiNb Phosphate Glasses

TiNb glasses were prepared by standard melt-quench methodology. An example composition included only $TiO_2$ (67.5 mol %), $Nb_2O_5$ (5.0 mol %) and $P_2O_5$ (27.5 mol %). $P_2O_5$ was typically added to the batch as phosphoric acid ($H_3PO_4$), which required calcining the batches at 350-400° C. prior to melting at 1,550-1,600° C. in platinum crucibles. Glasses, once formed, were annealed from 620-690° C. to remove color as well as reduce internal strain. Following annealing, properties such as thermal expansion coefficient, $T_g$, and refractive index were determined.

Example 2

Sample Glass Compositions and Characterization

Basic TiNb phosphate glass compositions were prepared according to the protocol described in Example 1. Some of the glass compositions included only $Nb_2O_5$, $TiO_2$, and $P_2O_5$. Several other glass compositions had additional alkali metal oxides such as, for example, $Na_2O$ or $K_2O$. These compositions and their properties are presented in Table 1.

In Table 1 and the tables that follow, a tilde (~) next to a temperature indicates an approximate anneal point. All temperatures are in ° C.

The following parameters in the tables below are defined as follows:
$T_{str}$: strain temperature
$T_{ann}$: anneal temperature
$T_s$: softening temperature
$T_g$: glass transition temperature
$T_x$: temperature of onset of crystallization
$\alpha_{300}$: coefficient of thermal expansion from room temperature to 300° C.
$n_{633}$: refractive index measured at 633 nm
$n_{981}$: refractive index measured at 981 nm
$n_{1549}$: refractive index measured at 1549 nm

TABLE 1

Glass Compositions with and without Alkali Metal Oxides

| | 1 | 2 | 3 | 4 | 5 | 6 | 7 | 8 |
|---|---|---|---|---|---|---|---|---|
| | | | | mol % | | | | |
| $Na_2O$ | 0 | 0 | 0 | 0 | 0 | 7.5 | 15 | 0 |
| $K_2O$ | 0 | 0 | 0 | 0 | 0 | 0 | 0 | 7.5 |
| $Nb_2O_5$ | 5 | 10 | 15 | 35 | 40 | 15 | 15 | 15 |
| $TiO_2$ | 67.5 | 62.5 | 57.5 | 37.5 | 32.5 | 50 | 42.5 | 50 |
| $P_2O_5$ | 27.5 | 27.5 | 27.5 | 27.5 | 27.5 | 27.5 | 27.5 | 27.5 |
| | | | | wt % | | | | |
| $Na_2O$ | 0 | 0 | 0 | 0 | 0 | 3.75 | 7.59 | 0 |
| $K_2O$ | 0 | 0 | 0 | 0 | 0 | 0 | 0 | 5.61 |
| $Nb_2O_5$ | 12.5 | 23.0 | 31.9 | 57.4 | 62.0 | 32.3 | 32.6 | 31.7 |
| $TiO_2$ | 50.7 | 43.2 | 36.8 | 18.5 | 15.1 | 32.3 | 27.8 | 31.7 |
| $P_2O_5$ | 36.7 | 33.8 | 31.3 | 24.1 | 22.8 | 31.6 | 31.9 | 31.0 |
| $T_{str}$ | | | | 62 | 629 | 598 | 613 | 620 |
| $T_{ann}$ | ~625 | ~630 | ~628 | 659 | 662 | 630 | 645 | 655 |
| $T_s$ | | | | | | 751 | 762 | 775 |
| $T_g$ | 640 | 645 | 643 | | | 647 | 662 | 665 |
| $T_x$ | 840 | 855 | 849 | | | 793 | 815 | 831 |
| $\alpha_{300}$ | | | | 35.7 | 33.5 | 57.3 | 71.3 | 56.3 |
| $n_{633}$ | | | 1.991 | 2.044 | | | | |
| $n_{1549}$ | | | 1.930 | 1.976 | | | | |

Additional TiNb phosphate glass compositions were prepared according to the protocol described in Example 1. These contained alkali metal oxides including $Na_2O$ or $K_2O$ as well as higher percentages of $Nb_2O_5$. These compositions and their properties are presented in Table 2.

TABLE 2

Glass Compositions with Alkali Metal Oxides and Higher Niobium Percentages

| | 9 | 10 | 11 | 12 | 13 | 14 | 15 | 16 |
|---|---|---|---|---|---|---|---|---|
| | | | | mol % | | | | |
| $Na_2O$ | 0 | 7.5 | 15 | 0 | 0 | 0 | 0 | 0 |
| $K_2O$ | 15 | 0 | 0 | 7.5 | 15 | 15 | 0 | 0 |
| $Nb_2O_5$ | 15 | 35 | 35 | 35 | 35 | 30 | 35 | 10 |
| $TiO_2$ | 42.5 | 30 | 22.5 | 30 | 22.5 | 27.5 | 40 | 60 |
| $P_2O_5$ | 27.5 | 27.5 | 27.5 | 27.5 | 27.5 | 27.5 | 25 | 30 |
| | | | | wt % | | | | |
| $Na_2O$ | 0 | 2.88 | 5.82 | 0 | 0 | 0 | 0 | 0 |
| $K_2O$ | 11.1 | 0 | 0 | 4.33 | 8.60 | 9.12 | 0 | 0 |
| $Nb_2O_5$ | 31.4 | 57.9 | 58.4 | 57.0 | 56.6 | 51.5 | 57.9 | 22.7 |
| $TiO_2$ | 26.7 | 14.9 | 11.3 | 14.7 | 10.9 | 14.2 | 19.9 | 40.9 |
| $P_2O_5$ | 30.7 | 24.3 | 24.5 | 23.9 | 23.8 | 25.2 | 22.1 | 36.4 |
| $T_{str}$ | 643 | 624 | 632 | 634 | | 653 | | 599 |
| $T_{ann}$ | 676 | 657 | 665 | 667 | ~690 | 687 | | 633 |
| $T_s$ | 795 | | 783 | | | 808 | | 752 |
| $T_g$ | 697 | 673 | 678 | 684 | 705 | 703 | | |
| $T_x$ | 846 | 796 | 841 | 809 | 870 | 864 | | |
| $\alpha_{300}$ | 71.4 | 47.6 | 60.1 | 48.4 | | 61.8 | | 42.0 |
| $n_{633}$ | | | | 1.998 | 1.959 | 1.942 | | |
| $n_{981}$ | | | | 1.958 | 1.922 | 1.906 | | |
| $n_{1549}$ | | | | 1.935 | 1.901 | 1.885 | | |

Ternary TiNb phosphate glass compositions consisting only of $Nb_2O_5$, $TiO_2$, and $P_2O_5$ were prepared according to the protocol described in Example 1. These compositions and their properties are presented in Table 3.

TABLE 3

| Ternary Glass Compositions | | | | | | | | |
|---|---|---|---|---|---|---|---|---|
|  | 17 | 18 | 19 | 20 | 21 | 22 | 23 | 24 |
| mol % | | | | | | | | |
| $Nb_2O_5$ | 10 | 20 | 20 | 30 | 30 | 35 | 20 | 30 |
| $TiO_2$ | 65 | 50 | 55 | 40 | 45 | 35 | 45 | 35 |
| $P_2O_5$ | 25 | 30 | 25 | 30 | 25 | 30 | 35 | 35 |

TABLE 3-continued

| Ternary Glass Compositions | | | | | | | | |
|---|---|---|---|---|---|---|---|---|
|  | 17 | 18 | 19 | 20 | 21 | 22 | 23 | 24 |
| wt % | | | | | | | | |
| $Nb_2O_5$ | 23.3 | 39.2 | 40.1 | 51.7 | 52.7 | 56.8 | 38.3 | 50.6 |
| $TiO_2$ | 45.5 | 29.4 | 33.1 | 20.7 | 23.8 | 17.1 | 25.9 | 17.8 |
| $P_2O_5$ | 31.1 | 31.4 | 26.8 | 27.6 | 23.5 | 26.0 | 35.8 | 31.6 |
| $T_{str}$ | 592 | 614 | 599 | 621 | 616 | 625 | 628 | 649 |
| $T_{ann}$ | 624 | 649 | 632 | 656 | 650 | 660 | 666 | 687 |
| $T_s$ | 730 | 765 |  | 782 |  |  | 812 | 827 |
| $\alpha_{300}$ | 46.4 | 38.7 | 41.8 | 35.7 | 39.3 | 34.5 | 35.1 | 32.5 |

Basic TiNb phosphate glass compositions were prepared according to the protocol described in Example 1. These contained the ternary system of $Nb_2O_5$, $TiO_2$, and $P_2O_5$ as well as $K_2O$, BaO, and ZnO. These compositions and their properties are presented in Table 4.

TABLE 4

| Glass Compositions with Alkali Metal Oxides and Zinc and Barium Oxides | | | | | | | | |
|---|---|---|---|---|---|---|---|---|
|  | 25 | 26 | 27 | 28 | 29 | 30 | 31 | 32 |
| mol % | | | | | | | | |
| $K_2O$ | 7.5 | 0 | 7.5 | 0 | 7.5 | 0 | 7.5 | 0 |
| BaO | 7.5 | 15 | 0 | 0 | 7.5 | 15 | 0 | 0 |
| ZnO | 0 | 0 | 7.5 | 15 | 0 | 0 | 7.5 | 15 |
| $Nb_2O_5$ | 15 | 15 | 15 | 15 | 35 | 35 | 35 | 35 |
| $TiO_2$ | 42.5 | 42.5 | 42.5 | 42.5 | 22.5 | 22.5 | 22.5 | 22.5 |
| $P_2O_5$ | 27.5 | 27.5 | 27.5 | 27.5 | 27.5 | 27.5 | 27.5 | 27.5 |
| wt % | | | | | | | | |
| $K_2O$ | 5.37 | 0 | 5.60 | 0 | 4.19 | 0 | 4.33 | 0 |
| BaO | 8.75 | 16.9 | 0 | 0 | 6.82 | 13.3 | 0 | 0 |
| ZnO | 0 | 0 | 4.84 | 9.76 | 0 | 0 | 3.74 | 7.52 |
| $Nb_2O_5$ | 30.2 | 29.3 | 31.6 | 31.9 | 55.1 | 53.7 | 57.0 | 57.3 |
| $TiO_2$ | 25.8 | 25.0 | 26.9 | 27.1 | 10.7 | 10.4 | 11.0 | 11.1 |
| $P_2O_5$ | 29.7 | 28.7 | 31.0 | 31.2 | 23.1 | 22.5 | 23.9 | 24.0 |
| $T_{str}$ | 648 | 655 | 586 | 565 | 655 | 666 | 611 | 583 |
| $T_{ann}$ | 683 | 689 | 621 | 600 | 690 | 701 | 647 | 618 |
| $T_s$ | 798 | 811 | 741 | 720 | 809 | 824 |  |  |
| $T_g$ | 693 | 707 | 637 | 612 | 708 | 716 | 655 | 632 |
| $T_x$ | 870 | 848 | 851 | 758 | 860 | 863 | 761 | 731 |
| $\alpha_{300}$ | 65.4 | 58.7 | 57.7 | 44.7 | 54.8 | 50.0 | 48.1 | 38.2 |
| $n_{633}$ |  |  |  |  | 1.9793 | 2.002 | 1.9785 |  |
| $n_{981}$ |  |  |  |  | 1.9413 | 1.963 | 1.9404 |  |
| $n_{1549}$ |  |  |  |  | 1.9204 | 1.9416 | 1.9195 |  |

Basic TiNb phosphate glass compositions were prepared according to the protocol described in Example 1. These contained the ternary system of $Nb_2O_5$, $TiO_2$, and $P_2O_5$ as well as BaO and ZnO. These compositions and their properties are presented in Table 5.

TABLE 5

| Glass Compositions with and without Zinc and Barium Oxides | | | | | | | | |
|---|---|---|---|---|---|---|---|---|
|  | 33 | 34 | 35 | 36 | 37 | 38 | 39 | 40 |
| mol % | | | | | | | | |
| BaO | 7.5 | 0 | 0 | 0 | 0 | 30 | 45 | 22.5 |
| ZnO | 7.5 | 0 | 0 | 0 | 0 | 0 | 0 | 0 |
| $Nb_2O_5$ | 35 | 25 | 30 | 35 | 35 | 15 | 15 | 35 |
| $TiO_2$ | 22.5 | 35 | 30 | 25 | 30 | 27.5 | 12.5 | 15 |
| $P_2O_5$ | 27.5 | 40 | 40 | 40 | 35 | 27.5 | 27.5 | 27.5 |
| wt % | | | | | | | | |
| BaO | 6.86 | 0 | 0 | 0 | 0 | 31.3 | 43.7 | 19.3 |
| ZnO | 3.64 | 0 | 0 | 0 | 0 | 0 | 0 | 0 |

TABLE 5-continued

Glass Compositions with and without Zinc and Barium Oxides

|  | 33 | 34 | 35 | 36 | 37 | 38 | 39 | 40 |
|---|---|---|---|---|---|---|---|---|
| $Nb_2O_5$ | 55.5 | 43.9 | 49.7 | 54.8 | 55.8 | 27.1 | 25.2 | 52.1 |
| $TiO_2$ | 10.7 | 18.5 | 14.9 | 11.8 | 14.4 | 14.9 | 6.32 | 6.71 |
| $P_2O_5$ | 23.3 | 37.5 | 35.4 | 33.4 | 29.8 | 26.6 | 24.7 | 21.9 |
| $T_{str}$ | 618 | | | | | | | |
| $T_{ann}$ | 653 | | | | | ~715 | ~704 | ~721 |
| $T_g$ | 665 | | | | | 730 | 719 | 736 |
| $T_x$ | 770 | | | | | 833 | 832 | 873 |
| $\alpha_{300}$ | 44 | | | | | | | |
| $n_{633}$ | 2.0035 | | | | | | 1.813 | 1.977 |
| $n_{981}$ | 1.9641 | | | | | | 1.792 | 1.941 |
| $n_{1549}$ | 1.9426 | | | | | | 1.779 | 1.921 |

Basic TiNb phosphate glass compositions were prepared according to the protocol described in Example 1. These contained the ternary system of $Nb_2O_5$, $TiO_2$, and $P_2O_5$ as well as $K_2O$, $BaO$, and $B_2O_3$. These compositions and their properties are presented in Table 6.

TABLE 6

Glass Compositions with Potassium, Barium, and Boron Oxides

|  | 41 | 42 | 43 | 44 | 45 | 46 | 47 | 48 |
|---|---|---|---|---|---|---|---|---|
| | mol % | | | | | | | |
| $K_2O$ | 0 | 0 | 0 | 22.5 | 22.5 | 7.5 | 0 | 0 |
| BaO | 30 | 10 | 20 | 0 | 0 | 0 | 0 | 0 |
| $Nb_2O_5$ | 35 | 30 | 30 | 15 | 35 | 30 | 35 | 35 |
| $TiO_2$ | 7.5 | 20 | 10 | 35 | 15 | 22.5 | 37.5 | 37.5 |
| $P_2O_5$ | 27.5 | 40 | 40 | 27.5 | 27.5 | 40 | 25 | 22.5 |
| $B_2O_3$ | 0 | 0 | 0 | 0 | 0 | 0 | 2.5 | 5 |
| | wt % | | | | | | | |
| $K_2O$ | 0 | 0 | 0 | 16.5 | 12.8 | 4.37 | 0 | 0 |
| BaO | 25.0 | 9.13 | 17.5 | 0 | 0 | 0 | 0 | 0 |
| $Nb_2O_5$ | 50.5 | 47.5 | 45.5 | 31.1 | 56.3 | 49.3 | 58.0 | 58.7 |
| $TiO_2$ | 3.25 | 9.52 | 4.56 | 21.8 | 7.25 | 11.1 | 18.7 | 18.9 |
| $P_2O_5$ | 21.2 | 33.8 | 32.4 | 30.5 | 23.6 | 35.1 | 22.1 | 20.1 |
| $B_2O_3$ | 0 | 0 | 0 | 0 | 0 | 0 | 1.09 | 2.2 |
| $T_{str}$ | | | | | | | 613 | |
| $T_{ann}$ | ~722 | ~784 | ~747 | ~689 | ~702 | ~789 | 645 | |
| $T_g$ | 737 | 799 | 762 | 704 | 717 | 804 | 651 | 637 |
| $T_x$ | 887 | 911 | 906 | 754 | 817 | 913 | 743 | 717 |
| $\alpha_{300}$ | | | | | | | 34.9 | |
| $n_{633}$ | 1.941 | | | | | | | |
| $n_{981}$ | 1.909 | | | | | | | |
| $n_{1549}$ | 1.891 | | | | | | | |

Basic TiNb phosphate glass compositions were prepared according to the protocol described in Example 1. These contained the ternary system of $Nb_2O_5$, $TiO_2$, and $P_2O_5$ as well as additional metal oxides including $K_2O$, $BaO$, $SnO_2$, and $B_2O_3$. These compositions are presented in Table 7.

TABLE 7

Glass Compositions with Additional Metal Oxides

|  | 49 | 50 | 51 | 52 | 53 | 54 | 55 | 56 |
|---|---|---|---|---|---|---|---|---|
| | mol % | | | | | | | |
| $K_2O$ | 0 | 15 | 15 | 15 | 0 | 0 | 0 | 0 |
| BaO | 0 | 0 | 0 | 0 | 15 | 15 | 15 | 0 |
| ZnO | 0 | 0 | 0 | 0 | 0 | 0 | 0 | 35 |
| $Nb_2O_5$ | 35 | 35 | 35 | 35 | 35 | 35 | 35 | 7.5 |
| $TiO_2$ | 35 | 22.5 | 22.5 | 20 | 22.5 | 22.5 | 20 | 30 |
| $SnO_2$ | 2.5 | 0 | 0 | 2.5 | 0 | 0 | 2.5 | 0 |

TABLE 7-continued

Glass Compositions with Additional Metal Oxides

|  | 49 | 50 | 51 | 52 | 53 | 54 | 55 | 56 |
|---|---|---|---|---|---|---|---|---|
| $P_2O_5$ | 27.5 | 25 | 22.5 | 27.5 | 02 | 22.5 | 27.5 | 27.5 |
| $B_2O_3$ | 0 | 2.5 | 5 | 0 | 2.5 | 5 | 0 | 0 |
| wt % | | | | | | | | |
| $K_2O$ | 0 | 8.70 | 8.80 | 8.51 | 0 | 0 | 0 | 0 |
| BaO | 0 | 0 | 0 | 0 | 13.4 | 13.6 | 13.2 | 0 |
| ZnO | 0 | 0 | 0 | 0 | 0 | 0 | 0 | 25.6 |
| $Nb_2O_5$ | 56.8 | 57.3 | 57.9 | 56.0 | 54.3 | 54.9 | 53.2 | 17.9 |
| $TiO_2$ | 17.1 | 11.1 | 11.2 | 9.62 | 10.5 | 10.6 | 9.14 | 21.5 |
| $SnO_2$ | 2.30 | 0 | 0 | 2.27 | 0 | 0 | 2.15 | 0 |
| $P_2O_5$ | 23.8 | 21.8 | 19.9 | 23.5 | 20.7 | 18.8 | 22.3 | 35.0 |
| $B_2O_3$ | 0 | 1.07 | 2.17 | 0 | 1.02 | 2.05 | 0 | 0 |
| $T_{str}$ | 619 | 625 | 617 | 647 | 641 | 623 | 659 | 529 |
| $T_{ann}$ | 653 | 659 | 650 | 681 | 675 | 658 | 694 | 562 |
| $T_s$ | | | | | | | | 671 |
| $T_g$ | 664 | 675 | 652 | 697 | 688 | 670 | 708 | 571 |
| $T_x$ | 793 | 784 | 737 | 849 | 813 | 761 | 864 | 689 |
| $\alpha_{300}$ | 36.3 | 60.6 | 58.4 | 59.2 | 52.4 | 50.5 | 50.8 | 52.6 |
| $n_{633}$ | 2.04 | | | 1.957 | | | 2.001 | |
| $n_{981}$ | 1.995 | | | 1.92 | | | 1.962 | |

Basic TiNb phosphate glass compositions were prepared according to the protocol described in Example 1. These contained the ternary system of $Nb_2O_5$, $TiO_2$, and $P_2O_5$ as well as additional metal oxides including ZnO, $SnO_2$, and $Sb_2O_3$. These compositions are presented in Table 8.

TABLE 8

Glass Compositions with Zinc, Tin, and Antimony Oxides

|  | 57 | 58 | 59 | 60 | 61 | 62 | 63 | 64 |
|---|---|---|---|---|---|---|---|---|
| mol % | | | | | | | | |
| ZnO | 35 | 35 | 35 | 22.5 | 30 | 30 | 30 | 35 |
| $Nb_2O_5$ | 15 | 15 | 15 | 35 | 35 | 35 | 35 | 22.5 |
| $TiO_2$ | 22.5 | 20 | 20 | 15 | 7.5 | 5 | 5 | 15 |
| $SnO_2$ | 0 | 2.5 | 0 | 0 | 0 | 2.5 | 0 | 0 |
| $P_2O_5$ | 27.5 | 27.5 | 27.5 | 27.5 | 27.5 | 27.5 | 27.5 | 27.5 |
| $Sb_2O_3$ | 0 | 0 | 2.5 | 0 | 0 | 0 | 2.5 | 0 |
| wt % | | | | | | | | |
| ZnO | 22.7 | 22.4 | 21.8 | 11.3 | 15.0 | 14.9 | 14.5 | 20.4 |
| $Nb_2O_5$ | 31.8 | 31.4 | 30.5 | 57.3 | 57.2 | 56.6 | 55.4 | 42.9 |
| $TiO_2$ | 14.3 | 12.6 | 12.2 | 7.38 | 3.69 | 2.43 | 2.38 | 8.60 |
| $SnO_2$ | 0 | 2.96 | 0 | 0 | 0 | 2.29 | 0 | 0 |
| $P_2O_5$ | 31.1 | 30.7 | 29.9 | 24.0 | 24.0 | 23.8 | 23.3 | 28.0 |
| $Sb_2O_3$ | 0 | 0 | 5.57 | 0 | 0 | 0 | 4.34 | 0 |
| $T_{str}$ | 536 | | 517 | 582 | 569 | 569 | 557 | 545 |
| $T_{ann}$ | 568 | | 549 | 616 | 601 | 601 | 590 | 577 |
| $T_s$ | 680 | | | | | | | |
| $T_g$ | 580 | 570 | 563 | 624 | 612 | 607 | 596 | 588 |
| $T_x$ | 694 | 712 | 705 | 708 | 684 | 680 | 675 | 728 |
| $\alpha_{300}$ | 49 | | 50.3 | 38.7 | 39.1 | 37.7 | 40.9 | 46.1 |
| $n_{633}$ | 1.884 | | 1.886 | 1.988 | 1.963 | 1.955 | 1.955 | |
| $n_{981}$ | 1.855 | | 1.857 | 1.95 | 1.928 | 1.921 | 1.922 | |

Throughout this publication, various publications are referenced. The disclosures of these publications in their entireties are hereby incorporated by reference into this application in order to more fully describe the methods, compositions, and compounds herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed:

1. A glass composition comprising $TiO_2$ in the amount of 1 mol % to 70 mol %, $Nb_2O_5$ in the amount of 1 mol % to 40 mol %, and $P_2O_5$ in the amount of 20 mol % to 45 mol %, wherein the glass does not include $Li_2O$, $Na_2O$, $K_2O$, and $B_2O_3$.

2. The glass composition of claim 1, wherein the glass composition further comprises one or more metal oxides selected from the group consisting of $Rb_2O$, $Cs_2O$, MgO, CaO, SrO, BaO, ZnO, CdO, $Y_2O_3$, $La_2O_3$, $ZrO_2$, $Al_2O_3$, $Ga_2O_3$, $SiO_2$, $GeO_2$, $SnO_2$, $Sb_2O_3$, $Bi_2O_3$, or any combination thereof.

3. The glass composition of claim 1, wherein the glass composition further comprises a metal oxide selected from the group consisting of: (a) greater than 0 mol % to 45 mol % BaO, (b) greater than 0 mol % to 45 mol % ZnO, (c) greater than 0 mol % to 10 mol % $SnO_2$, (d) or any combination thereof.

4. The glass composition of claim 1, wherein the glass composition has a refractive index of at least 1.75 at 633 nm at 25° C.

5. The glass composition of claim 1, wherein the glass composition has a refractive index of at least 1.75 at 1,549 nm at 25° C.

6. The glass composition of claim 1, wherein the glass composition has an anneal point from 540° C. to 800° C.

7. An optical article comprising the glass composition of claim 1.

8. A glass composition comprising $TiO_2$ in the amount of 1 mol % to 70 mol %, $Nb_2O_5$ in the amount of 1 mol % to 40 mol %, and $P_2O_5$ in the amount of 20 mol % to 45 mol %, wherein the molar sum of $TiO_2$ and $Nb_2O_5$ in the glass composition is greater than 15 mol %, wherein the glass does not include $SiO_2$, $WO_3$, $Li_2O$, $Na_2O$, $K_2O$, and $B_2O_3$.

9. The glass composition of claim 8, wherein the molar sum of $TiO_2$ and $Nb_2O_5$ in the glass composition is greater than 40 mol %.

10. The glass composition of claim 8, wherein the molar sum of $TiO_2$ and $Nb_2O_5$ in the glass composition is greater than 60 mol %.

11. The glass composition of claim 8, wherein the glass composition further comprises a metal oxide selected from the group consisting of $Rb_2O$, $Cs_2O$, MgO, CaO, SrO, BaO, ZnO, CdO, $Y_2O_3$, $La_2O_3$, $ZrO_2$, $Al_2O_3$, $Ga_2O_3$, $GeO_2$, $SnO_2$, $Sb_2O_3$, $Bi_2O_3$, or any combination thereof.

12. The glass composition of claim 8, wherein the glass composition further comprises a metal oxide selected from the group consisting of: (a) greater than 0 mol % to 45 mol % BaO, (b) greater than 0 mol % to 40 mol % ZnO, (c) greater than 0 mol % to 10 mol % $SnO_2$, or (d) any combination thereof.

13. The glass composition of claim 8, wherein the glass composition has a refractive index of at least 1.75 at 633 nm at 25° C.

14. The glass composition of claim 8, wherein the glass composition has a refractive index of at least 1.75 at 1,549 nm at 25° C.

15. The glass composition of claim 8, wherein the glass composition has an anneal point from 540° C. to 800° C.

16. An optical article comprising the glass composition of claim 8.

17. A glass composition comprising $TiO_2$ in the amount of 5 mol % to 70 mol %, $Nb_2O_5$ in the amount of 5 mol % to 40 mol %, $P_2O_5$ in the amount of 20 mol % to 45 mol %, and at least one metal oxide selected from the group consisting of $Rb_2O$, $Cs_2O$, MgO, CaO, SrO, BaO, ZnO, CdO, $Y_2O_3$, $La_2O_3$, $ZrO_2$, $Al_2O_3$, $Ga_2O_3$, $SiO_2$, $GeO_2$, $SnO_2$, $Bi_2O_3$, and $Sb_2O_3$, wherein the glass does not include $Li_2O$, $Na_2O$, $K_2O$, and $B_2O_3$.

18. The glass composition of claim 17, wherein the one additional metal oxide is: (a) greater than 0 mol % to 45 mol % BaO, (b) greater than 0 mol % to 45 mol % ZnO, or (c) greater than 0 mol % to 10 mol % $SnO_2$.

19. The glass composition of claim 17, wherein the glass composition has a refractive index of at least 1.75 at 633 nm at 25° C.

20. The glass composition of claim 17, wherein the glass composition has a refractive index of at least 1.75 at 1,549 nm at 25° C.

21. The glass composition of claim 17, wherein the glass composition has an anneal point from 540° C. to 800° C.

22. An optical article comprising the glass composition of claim 17.

* * * * *

UNITED STATES PATENT AND TRADEMARK OFFICE
CERTIFICATE OF CORRECTION

PATENT NO. : 10,974,989 B2
APPLICATION NO. : 16/469456
DATED : April 13, 2021
INVENTOR(S) : Bruce Gardiner Aitken It is certified that error appears in the above-identified patent and that said Letters Patent is hereby corrected as shown below:

On the Title Page

In Column 2, item (56), Other Publications, Line 3, delete "(2006." and insert -- (2006). --, therefor.

In Column 2, item (56), Other Publications, Line 8, delete "Structre" and insert -- Structure --, therefor.

In Column 2, item (56), Other Publications, Line 12, delete "(2007." and insert -- (2007). --, therefor.

Signed and Sealed this
First Day of August, 2023

Katherine Kelly Vidal
*Director of the United States Patent and Trademark Office*